United States Patent
Inoue et al.

(10) Patent No.: US 10,836,253 B2
(45) Date of Patent: Nov. 17, 2020

(54) CONTROL SYSTEM FOR VEHICLE

(71) Applicant: Mazda Motor Corporation, Hiroshima (JP)

(72) Inventors: Masao Inoue, Hiroshima (JP); Nobuyuki Sakata, Hiroshima (JP); Atsushi Yagi, Hiroshima (JP); Naoki Yamada, Hiroshima (JP); Yoh Yamazaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 101 days.

(21) Appl. No.: 16/292,627

(22) Filed: Mar. 5, 2019

(65) Prior Publication Data

US 2019/0299781 A1    Oct. 3, 2019

(30) Foreign Application Priority Data

Mar. 29, 2018   (JP) .................. 2018-064583

(51) Int. Cl.
*B60K 26/02* (2006.01)
*B60T 7/04* (2006.01)
(Continued)

(52) U.S. Cl.
CPC ............ *B60K 26/021* (2013.01); *B60T 7/042* (2013.01); *B60T 8/326* (2013.01); *B60T 8/4081* (2013.01);
(Continued)

(58) Field of Classification Search
CPC . B60K 26/021; B60K 2026/023; B60T 7/042; B60T 8/326; B60T 8/4081;
(Continued)

(56) References Cited

U.S. PATENT DOCUMENTS

| 6,474,753 | B1 * | 11/2002 | Rieth | ...................... | G05G 1/38 |
| | | | | | 180/271 |
| 2007/0252811 | A1 * | 11/2007 | Arche | ................... | A63F 13/803 |
| | | | | | 345/156 |

(Continued)

FOREIGN PATENT DOCUMENTS

JP    2006281803 A    10/2006

OTHER PUBLICATIONS

European Patent Office, Extended European Search Report Issued in Application No. 19159600.6, dated Aug. 22, 2019, Germany, 9 pages.

*Primary Examiner* — Hussein Elchanti
(74) *Attorney, Agent, or Firm* — Alleman Hall Creasman & Tuttle LLP (57) ABSTRACT

A vehicle control system is provided, which includes an operating amount detector configured to detect an operating amount by an operator, of an operation mechanism comprising at least one of an accelerator pedal and a brake pedal, a speed detector configured to detect a vehicle traveling speed, a reaction-force generator configured to generate a reaction force of the pedal, and a controller. The controller includes a processor to execute an acceleration calculating module to calculate an acceleration based on the traveling speed and the operating amount, a rigidity characteristic setting module to set the reaction force so that a rigidity value that is a ratio of the reaction force to the operating amount increases as the acceleration increases, and a reaction-force control module to control the reaction-force generator so that the reaction force generated by the reaction-force generator becomes the reaction-force value set by the rigidity characteristic setting module.

10 Claims, 10 Drawing Sheets

(51) Int. Cl.
  *B60T 13/66*    (2006.01)
  *B60T 8/40*     (2006.01)
  *B60T 8/32*     (2006.01)
  *G05G 5/03*     (2008.04)
  *F02D 11/10*    (2006.01)

(52) U.S. Cl.
  CPC .......... *B60T 13/662* (2013.01); *F02D 11/105* (2013.01); *G05G 5/03* (2013.01); *B60K 2026/023* (2013.01); *B60T 8/3255* (2013.01); *B60T 2220/06* (2013.01); *B60T 2270/82* (2013.01)

(58) Field of Classification Search
  CPC .. B60T 13/662; B60T 8/3255; B60T 2220/06; B60T 2270/82; F02D 11/105; G05G 5/03
  See application file for complete search history.

(56) References Cited

U.S. PATENT DOCUMENTS

| | | | |
|---|---|---|---|
| 2009/0105953 A1* | 4/2009 | Sugano | B60W 50/16 701/301 |
| 2011/0031072 A1* | 2/2011 | Leiber | B60T 8/00 188/72.3 |
| 2011/0214526 A1* | 9/2011 | Demma | B60K 26/021 74/560 |
| 2013/0197771 A1* | 8/2013 | Takeda | B60T 13/745 701/70 |
| 2014/0109717 A1 | 4/2014 | Maruyama et al. | |
| 2016/0221437 A1 | 8/2016 | Takegawa et al. | |
| 2016/0246321 A1* | 8/2016 | Ooba | B60K 26/02 |

\* cited by examiner

CONTROL SYSTEM FOR VEHICLE

TECHNICAL FIELD

The present disclosure relates to a control system for a vehicle which controls a reaction force of an operation mechanism comprising at least one of an accelerator pedal and a brake pedal which are mounted on the vehicle.

BACKGROUND OF THE DISCLOSURE

Conventionally, vehicles provided with by-wire mechanisms using x-by-wire technologies are known. Some by-wire mechanisms are provided with an operation mechanism which is operated by an operator, a reaction-force generating mechanism which generates on the operation mechanism a reaction force to be given to the operator, and a driving mechanism which drives the vehicle so that the vehicle is operated by a given response amount according to the operating amount of the operation mechanism operated by the operator. In such a by-wire mechanism, the mechanical coupling between the operation mechanism (and the reaction-force generating mechanism) and the driving mechanism is replaced by an electrical coupling using electrical signals. The operation mechanism and the driving mechanism are controlled independently so that the operation of the operation mechanism by the operator, the reaction force to the operator, and the response of the vehicle are mechanically separated from each other.

Accelerator-by-wire or throttle-by-wire mechanism among various by-wire mechanisms uses a stroke of the accelerator pedal operated by the operator as a parameter to control a reaction force to the operator's operation (stepping force) through the accelerator pedal, and behavior (acceleration) of the vehicle. Generally, the reaction force generated in the accelerator pedal is set according to a characteristic proportional to an operator's stepping speed of the accelerator pedal to improve an operator's sensation while operating the accelerator pedal.

JP2006-281803A discloses a pedal device and an automobile provided with the pedal device. This device includes a pedal position detector which detects a pedal position or a pedal (operating) speed, a calculator which calculates a pedal reaction force comprised of a rigid reaction force which increases according to the detected pedal position, and a viscous reaction force which increases according to the pedal speed, and an actuator which operates based on an output from the calculator. The calculator controls the pedal reaction force to be below a given limit when the pedal speed exceeds a given value. Thus, the operator can quickly operate the pedal with a smaller operating force, i.e., the operability of the pedal is improved.

In order for the operator to obtain satisfaction and a sense of fulfillment while operating the vehicle (operating the operation mechanism), it is indispensable that the operator can operate the vehicle as he/she intended. Achievement of "operation as the operator intended" is that the operator is able to perform an intuitive operation based on a response accompanying his/her operation of the operation mechanism. In other words, it can also be defined as a traveling control which is desired by the operator being able to be performed based on the intuitive operation against the response. By the technology disclosed in JP2006-281803A, the operator can operate the accelerator pedal easily and quickly, when the operating speed of the accelerator pedal by the operator is fast (when the workload by the operator is large). However, in terms of the achievement of the "operation as the operator intended," the operating sensation in which the pedal reaction force decreases as the vehicle accelerates more results in an inverted relation between the acceleration of the vehicle and the operator's load. Therefore, this relation may give the operator discomfort because the operating sensation when the operator actually recognizes through the operation of the accelerator pedal does not match with the actual vehicle behavior.

In this regard, if the reaction force of the accelerator pedal is made proportional to the stepping position and the stepping speed of the accelerator pedal, the operating sensation of the accelerator pedal improves. However, in such a case, while the reaction force increases when the vehicle travels at a high constant speed, the reaction force decreases contrary to when the vehicle accelerates from a low speed. Therefore, the physical sensation of the operator through the operation mechanism still does not match with the actual vehicle behavior. That is, in order to enable the traveling control matched with the operator's intuitive operating sensation, there is still room for further improvement.

SUMMARY OF THE DISCLOSURE

One purpose of the present disclosure is to provide a control system for a vehicle, which enables a traveling control matched with an operator's intuitive operating sensation.

According to one aspect of the present disclosure, a control system for a vehicle is provided, which includes an operating amount detector configured to detect an operating amount by an operator, of an operation mechanism comprising at least one of an accelerator pedal and a brake pedal that are mounted on the vehicle, a speed detector configured to detect a traveling speed of the vehicle, a reaction-force generator configured to generate a reaction force of the pedal, and a controller electrically connected with the operating amount detector, the speed detector, and the reaction-force generator. The controller includes a processor configured to execute an acceleration calculating module to calculate an acceleration based on the traveling speed and the operating amount, a rigidity characteristic setting module to set the reaction force so that a rigidity value that is a ratio of the reaction force to the operating amount increases as the acceleration calculated by the acceleration calculating module increases, and a reaction-force control module to control the reaction-force generator so that the reaction force generated by the reaction-force generator becomes the reaction-force value set by the rigidity characteristic setting module.

According to this structure, since the control system has the operating amount detector which detects the operating amount by the operator, of the operation mechanism, the speed detector which detects the traveling speed of the vehicle, and the acceleration calculating module which calculates the acceleration based on the traveling speed and the operating amount, the acceleration which is a vehicle behavior resulting from the operating amount at least one of the accelerator pedal and the brake pedal by the operator can be calculated. Moreover, since the control system has the reaction-force control module which can control the reaction force given to the operator through the operation mechanism, a suitable operating sensation of the operation mechanism can be sensed by the operator. Further, since the reaction-force control module controls the reaction force so that the rigidity value which is the ratio of the reaction force of the operation mechanism to the operating amount increases as the calculated acceleration increases, the operating sensation of the operation mechanism can be directly associated with the acceleration of the vehicle, thereby matching the physical sensation (load tendency) of the operator through the operation mechanism with the actual vehicle behavior (acceleration tendency of operation). Therefore, the traveling control of the vehicle with the operator's intuitive operating sensation is possible.

The control system may further include memory configured to store a rigidity characteristic map defining a rigidity characteristic comprised of the acceleration and the rigidity value. The rigidity characteristic may have a first changing point at a position on the map near the acceleration that can be sensed by the operator, and the rigidity characteristic may be set so that a rigidity increasing rate when the acceleration is greater than that of the first changing point is greater than a rigidity increasing rate when the acceleration is less than that of the first changing point.

According to this structure, the operator's operating sensation can be divided into a non-accelerating range (a play range and a constant-speed range) and an acceleration range. Moreover, the operator can intuitively recognize the reference point when turning the operation mechanism back to the neutral position.

The rigidity characteristic may have a second changing point at which the acceleration is greater than the first changing point, and the rigidity characteristic being set so that the rigidity increasing rate when the acceleration is greater than that of the second changing point is less than the rigidity increasing rate when the acceleration is less than that of the second changing point.

According to this structure, the operability in a high acceleration range is secured, while the operator's operating sensation is divided into the acceleration range and the high acceleration range.

The control system may further include a gear position detector configured to detect a gear position of the vehicle, the first changing point being changed according to the detected gear position.

According to this structure, the operator's operating sensation can be changed for every gear position.

The reaction-force generator may include an electric motor configured to generate the reaction force according to the operating amount of the operation mechanism.

According to this structure, the physical sensation of the operator through the operation mechanism can be matched with the actual vehicle behavior with a simple configuration.

DETAILED DESCRIPTION OF THE DISCLOSURE

Hereinafter, one embodiment of the present disclosure is described in detail with reference to the accompanying drawings. The following description illustrates a control system for a vehicle provided with a steer-by-wire mechanism, an accelerator-by-wire or throttle-by-wire mechanism, and a brake-by-wire mechanism, to which the present disclosure is applied, but it is not to limit the present disclosure, its applications, and its usage.

Figure 1:
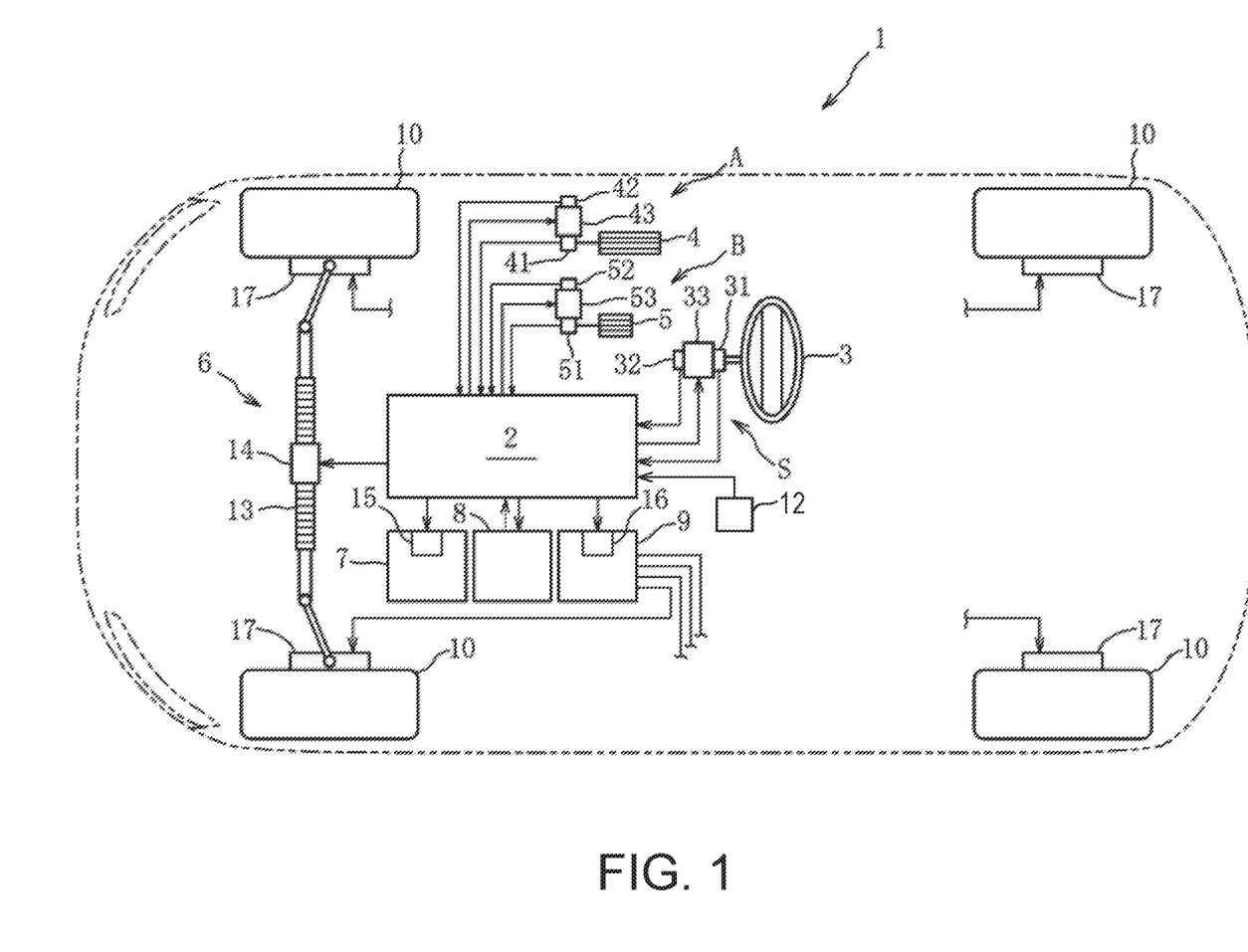
FIG. 1 is a view schematically illustrating the entire configuration of a control system for a vehicle according to one embodiment.

Below, one embodiment of the present disclosure is described based on FIGS. 1 to 10. As illustrated in FIG. 1, a vehicle of this embodiment has a control system 1 for vehicles. This control system 1 mainly includes a steer-by-wire mechanism S, an accelerator-by-wire mechanism A, a brake-by-wire mechanism B, and an ECU (Electronic Control Unit) 2, also referred to as a controller. The vehicle also includes a steering wheel 3 as an arm operating mechanism, an accelerator pedal 4 and a brake pedal 5 as leg operating mechanisms, a steering device 6, an engine 7, a transmission 8, a brake device 9, and two pairs of wheels 10.

The transmission 8 is, for example, an automatic transmission, and transmits an engine torque outputted from the engine 7 to a front-wheel differential gear mechanism (not illustrated) at a selected gear position. The transmission 8 is provided with a position sensor 11 (see FIG. 2) which detects a currently-selected gear position, as one example of a gear position detector. The vehicle is also provided with a speed sensor 12 (see FIG. 2) which detects a traveling speed of the vehicle, as one example of a speed detector. Detection signals from the position sensor 11 and the speed sensor 12 are outputted to the ECU 2 as needed.

Figure 2:
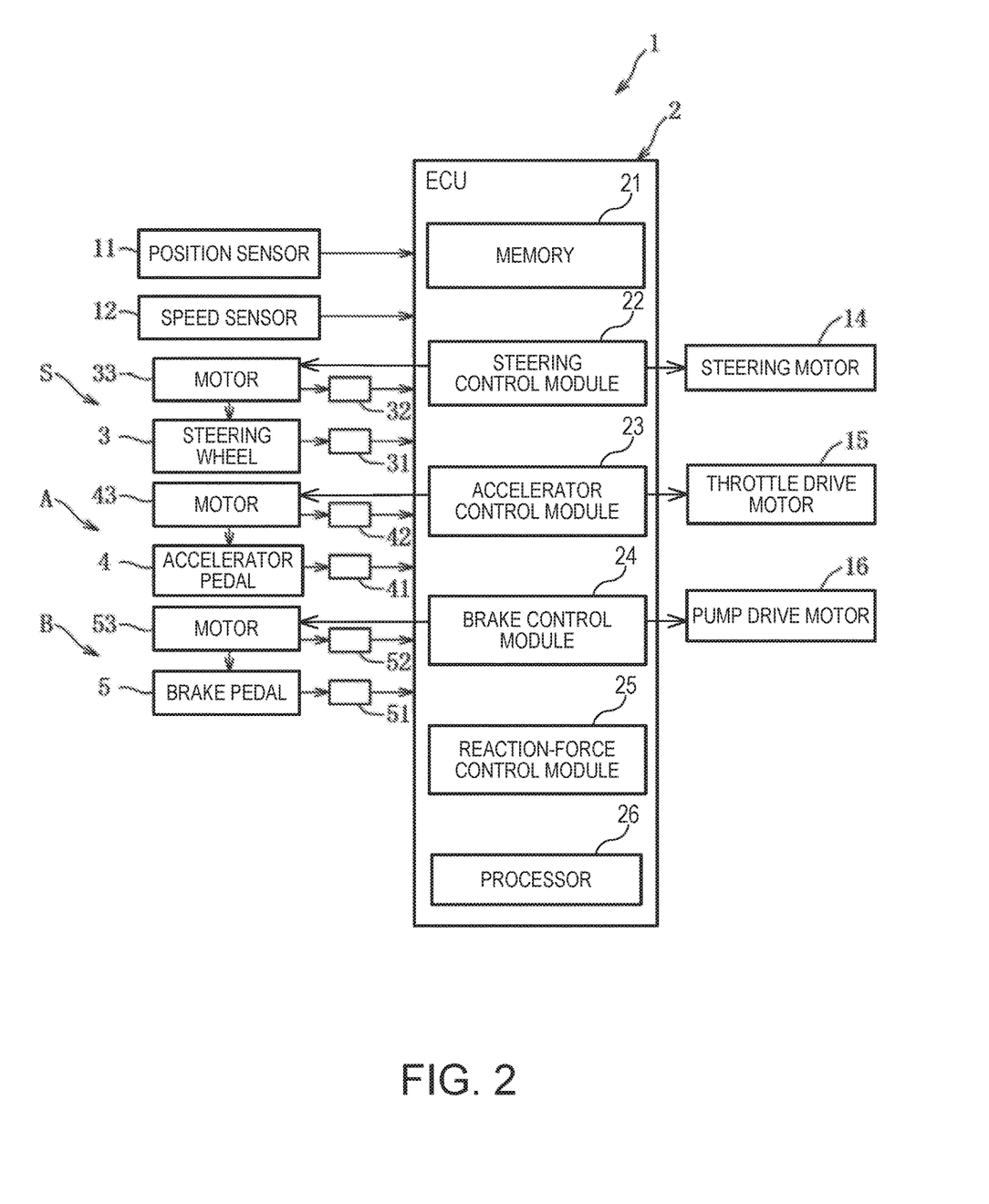
FIG. 2 is a block diagram illustrating the control system.

First, the steer-by-wire mechanism S is described. As illustrated in FIGS. 1 and 2, the steer-by-wire mechanism S is comprised of the steering wheel 3, and the steering device 6 which is a steer driving mechanism of a pair of left and right front wheels 10, which are mechanically separated from each other. The steer-by-wire mechanism S also includes a steering sensor 31 which detects an operating amount of the steering wheel 3 by the operator (e.g., a steering angle), a torque sensor 32 which detects an operating force (e.g., a steering torque) accompanying the operation of the steering wheel 3, and an electric motor 33 which gives a physical reaction force to the steering wheel 3 based on the operating amount of the steering wheel 3. The steering sensor 31 and the torque sensor 32 are both examples of an operating amount detector, alone or in combination.

The steering device 6 includes a steering rod 13 with a rack gear coupled to the front driving wheels 10 through linkages, and a steering motor 14 provided with a pinion gear which drives the steering rod 13 in the left-and-right directions. The steering motor 14 drives the steering rod 13 to steer the front wheels 10 so that a slip angle of the wheels 10 which is a physical response amount of the vehicle is controlled. The steering motor 14, the steering sensor 31, the torque sensor 32, and the motor 33 are electrically connected with the ECU 2.

Next, the accelerator-by-wire mechanism A is described. As illustrated in FIGS. 1 and 2, the accelerator-by-wire mechanism A is comprised of the accelerator pedal 4 having an organ-type pedal support structure where a heel of the operator is supported by a cabin floor panel during a pedal operation, and a throttle valve (not illustrated) of the engine 7, which are mechanically separated from each other. The accelerator-by-wire mechanism A also includes an accelerator sensor 41 which detects an operating amount of the accelerator pedal 4 by the operator (e.g., a rotation angle on a rotation axis corresponding to a stepping stroke of the pedal), and a torque sensor 42 which detects an operating force (e.g., stepping force) accompanying the operation of the accelerator pedal 4, and an electric motor 43 which gives a physical reaction force to the accelerator pedal 4 based on the operating amount of the accelerator pedal 4.

The engine 7 has a throttle drive motor 15 which drives a throttle valve to rotate. The throttle drive motor 15 adjusts a valve opening of the throttle valve to control an acceleration which is a physical response amount of the vehicle. The throttle drive motor 15, the accelerator sensor 41, the torque sensor 42, and the motor 43 are electrically connected with the ECU 2.

Next, the brake-by-wire mechanism B is described. As illustrated in FIGS. 1 and 2, the brake-by-wire mechanism B is comprised of the brake pedal 5 having a suspended pedal support structure in which the heel of the operator is not supported by the floor panel during a pedal operation, and a hydraulic brake mechanism 17 which brakes the wheels 10, which are mechanically separated from each other. The brake-by-wire mechanism B also includes a brake sensor 51 which detects an operating amount of the brake pedal 5 by the operator (stepping stroke), a torque sensor 52 which detects an operating force (stepping force) accompanying the operation of the brake pedal 5, and an electric motor 53 which gives a physical reaction force to the brake pedal 5 based on the operating amount of the brake pedal 5.

The hydraulic brake mechanism 17 includes rotor disks each provided to the wheel 10 so as to be integrally rotatable with the wheel 10, and calipers which can give a braking force to the rotor disks (none are illustrated). The brake device 9 includes a hydraulic pump having a pump drive motor 16 as a driving source, a pressurizing valve, and a return valve (none are illustrated). The hydraulic pump is connected with the cylinders disposed at the calipers. When a brake fluid pressure is supplied to the cylinders from the hydraulic pump, pistons press brake pads against the rotor disks to control a deceleration which is a physical response amount of the vehicle. The pump drive motor 16, the brake sensor 51, the torque sensor 52, and the electric motor 53 are electrically connected with the ECU 2. The motors 33, 43, and 53 are each examples of a reaction-force generator for one of the respective operating mechanisms.

Next, the ECU 2 is described. The ECU 2 is comprised of a processor 26 (e.g., a CPU (Central Processing Unit)), memory 21 comprising ROM and RAM, an IN-side interface, and an OUT-side interface. The ROM stores various programs and data for carrying out a collaborative control, and the RAM is provided with a processing area used by the processor 26 executing a series of processings. When the operator operates at least any one of the steering wheel 3, the accelerator pedal 4, and the brake pedal 5 which are the operation mechanisms, the ECU 2 transmits to the corresponding motors 14-16 operating instruction signal(s) for causing the vehicle to demonstrate the behavior according to the operating amount (response amount). Synchronizedly with the transmission of the operating instruction signals related to the vehicle behavior, the ECU 2 transmits to the corresponding motors 33, 43, and 53 operating instruction signals for generating the reaction forces according to the vehicle behavior.

As illustrated in FIG. 2, the ECU 2 has the memory 21 in which a steering control module 22, an accelerator control module 23, a brake control module 24, and a reaction-force control module 25 are stored as software. The processor 26 is configured to execute these modules to perform their respective functions. The steering control module 22, the accelerator control module 23, and the brake control module 24 are each examples of an acceleration calculating module and a rigidity characteristic setting module.

The memory 21 stores, in order to control the behavior of the vehicle, i.e., accelerations of movements, a plurality of lateral acceleration characteristic maps which define a relation between a slip angle of the front wheels 10 and a lateral acceleration, a plurality of acceleration characteristic maps which define a relation between the operating amount of the accelerator pedal 4 (rotation angle) and the acceleration, for every speed and gear position, and a deceleration characteristic map which defines a relation between the operating amount of the brake pedal 5 (stepping stroke) and a deceleration (none are illustrated). The memory 21 also stores, in order to control the reaction force to be given to the operator i.e., an operating load, a steering rigidity characteristic map M1, an accelerator rigidity characteristic map M2, and a brake rigidity characteristic map M3. Note that the term "acceleration" as used herein refers to, without being limited to the acceleration (actually-measured acceleration) calculated only based on the operating amount and the traveling speed, an acceleration based on the operating amount and the traveling speed in consideration of the vehicle control for stabilizing the vehicle behavior (i.e., a "predicted acceleration" which also considers the vehicle control). A calculation of the "predicted acceleration" will be described later.

Figure 3:
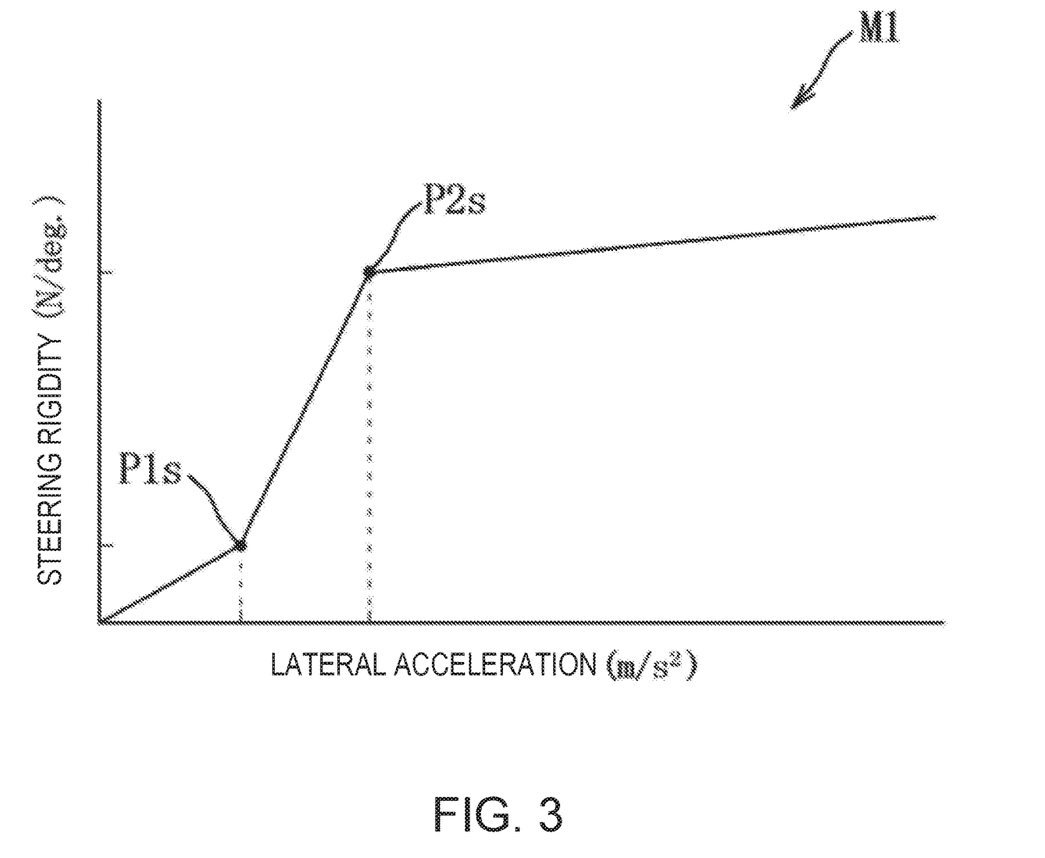
FIG. 3 is a steering rigidity characteristic map.

As illustrated in FIG. 3, the steering rigidity characteristic map M1 is set so that a steering rigidity increases as the lateral acceleration increases, where the lateral axis indicates the lateral acceleration (m/s') and the vertical axis indicates the steering rigidity (N/deg). The steering rigidity can be obtained by dividing the reaction force of the steering wheel 3 by the operating amount of the steering wheel 3 (steering angle). In the steering rigidity characteristic map M1, a first changing point P1s is set to divide a non-accelerating range (a play range and a constant-speed range) and a first acceleration range, and a second changing point P2s is set to divide the first acceleration range and a second acceleration range.

Figure 4:
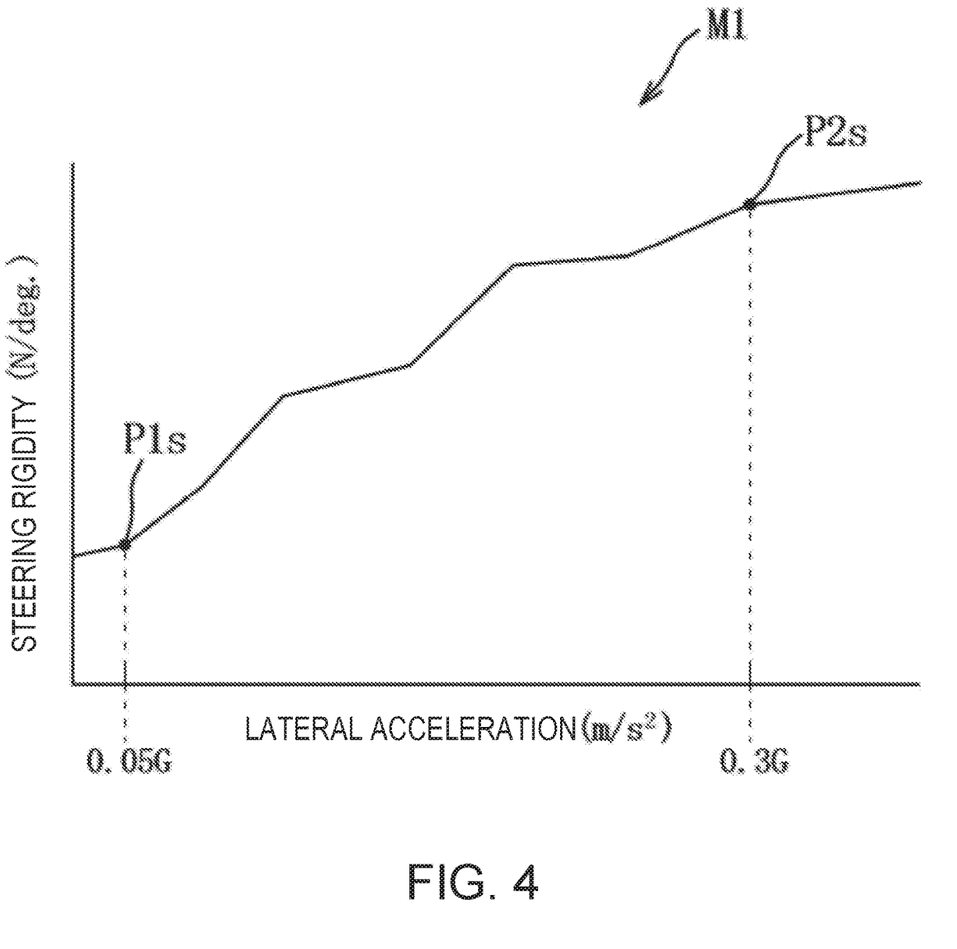
FIG. 4 is a graph illustrating the steering rigidity characteristic.

As illustrated in FIG. 4, the first changing point P1s is set to a lateral acceleration of the vehicle which can be sensed by the operator (e.g., 0.05 G), and the second changing point P2s is set to a lateral acceleration at which the operator senses the operation of the steering wheel 3 as a burden in terms of workload under a given condition (e.g., 0.30 G). The given condition is a steering range of 60 degrees to the left and 60 degrees to the right from the neutral position of the steering wheel 3, while the operator does not switch his/her hand on the steering wheel 3 from one to another. Thus, when this given condition is satisfied, the steering rigidity characteristic map M1 is used. Assuming that a rigidity increasing rate in the non-accelerating range is Ks0, a rigidity increasing rate in the first acceleration range is Ks1, and a rigidity increasing rate in the second acceleration range is Ks2, a relation of the following formula (1) can be established.

$$0 \leq Ks2 < Ks0 < Ks1 \tag{1}$$

Figure 5:
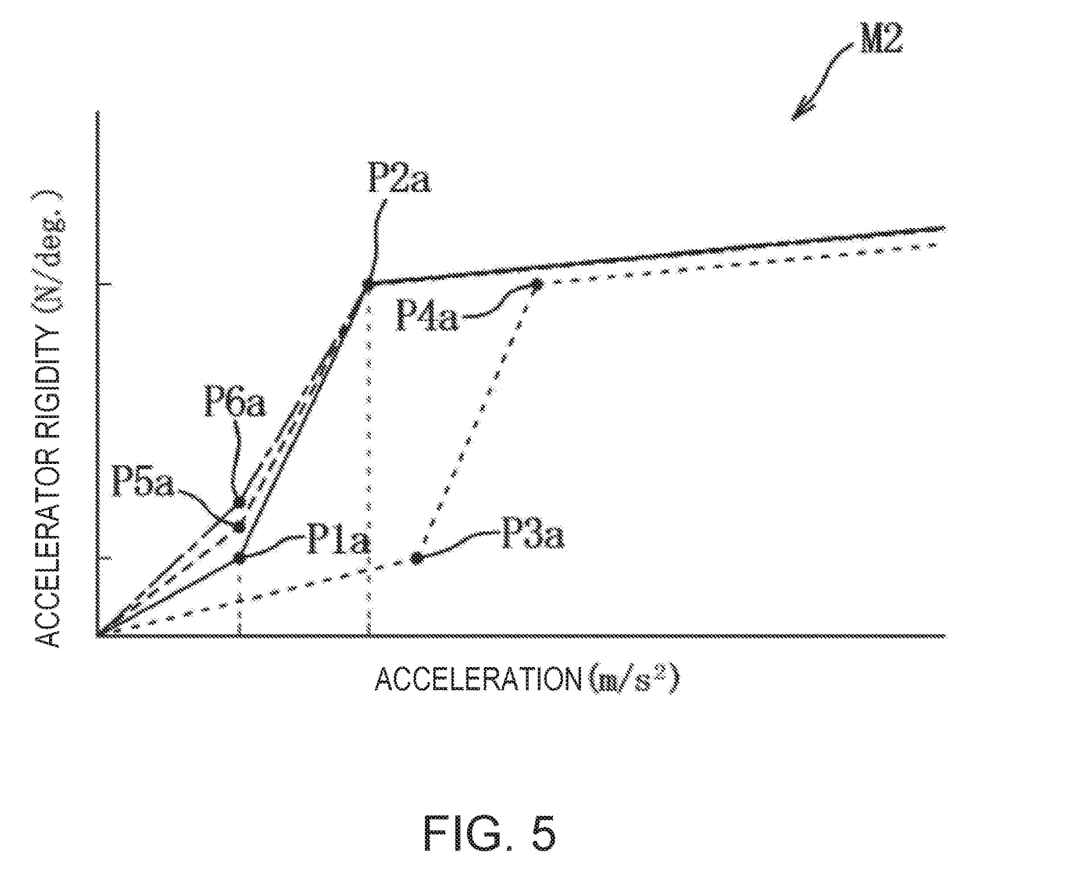
FIG. 5 is an accelerator rigidity characteristic map.

As illustrated in FIG. 5, the accelerator rigidity characteristic map M2 is set so that the acceleration increases as an accelerator rigidity increases, where the lateral axis indicates the acceleration (m/s$^2$) and the vertical axis indicates the accelerator rigidity (N/deg). The accelerator rigidity can be obtained by dividing the reaction force of the accelerator pedal 4 by the operating amount of the accelerator pedal 4 (rotation angle). In the accelerator rigidity characteristic map M2, a first changing point P1a (also P5a, P6a) is set to divide a non-accelerating range (a play range and a constant-speed range) and a first acceleration range, and a second changing point P2*a* is set to divide the first acceleration range and a second acceleration range.

Figure 6:
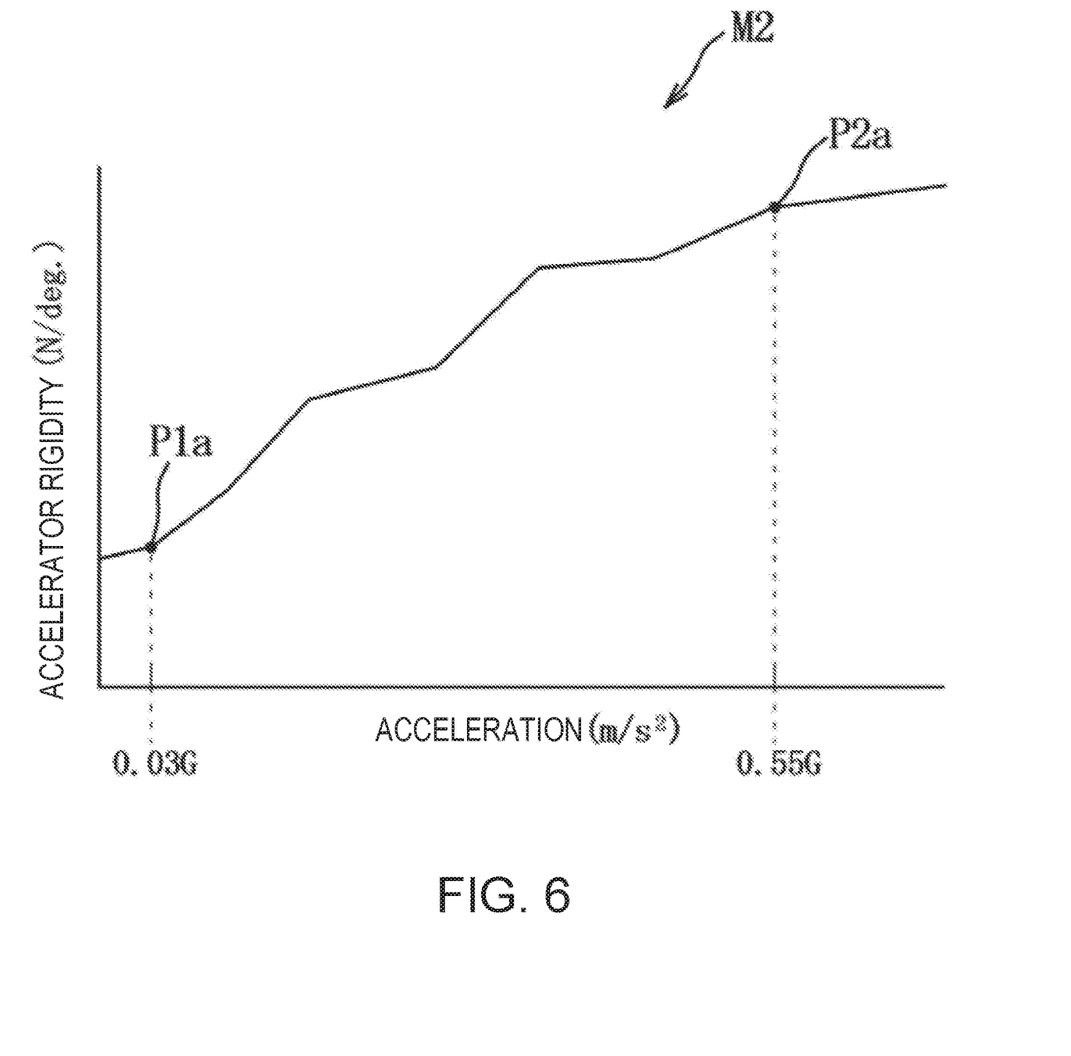
FIG. 6 is a graph illustrating the accelerator rigidity characteristic.

As illustrated in FIG. 6, the first changing point P1*a* is set to an acceleration of the vehicle which can be sensed by the operator (e.g., 0.03 G), and the second changing point P2*a* is set to an acceleration at which the operator senses the operation of the accelerator pedal 4 as a burden in terms of workload (e.g., 0.55 G). Assuming that a rigidity increasing rate in the non-accelerating range is Ks0, a rigidity increasing rate in the first acceleration range is Ka1, and a rigidity increasing rate in the second acceleration range is Ka2, a relation of the following formula (2) can be established.

$$0 \leq Ka2 < Ka0 < Ka1 \qquad (2)$$

As illustrated in FIG. 5, in the accelerator rigidity characteristic map M2, the rigidity characteristic is changed corresponding to the currently-selected gear position. A first changing point P3*a* of the rigidity characteristic (dotted line) at the 1st gear has the same accelerator rigidity value as the first changing point P1*a* of the rigidity characteristic (solid line) at the 2nd gear, but has a greater acceleration than the first changing point P1*a*. This is to secure an initial power for driving a stopped vehicle. A second changing point P4*a* of the rigidity characteristic (dotted line) at the 1st gear has the same accelerator rigidity value as the second changing point P2*a* of the rigidity characteristic (solid line) at the 2nd gear, but has a greater acceleration than the second changing point P2*a*. This is to make a rigidity increasing rate in the first acceleration range at the 1st gear substantially the same as the rigidity increasing rate Ka1 in the first acceleration range at the 2nd gear. Note that the rigidity increasing rates in the second acceleration range are substantially the same.

The first changing point P5*a* of the rigidity characteristic (dashed line) at the 3rd gear has the same acceleration value as the first changing point P1*a* of the rigidity characteristic (solid line) at the 2nd gear, but has a higher accelerator rigidity than the first changing point P1*a*. The first changing point P6*a* of the rigidity characteristic (one-point chain line) at the 6th gear has the same acceleration value as the first changing point P5*a* of the rigidity characteristic (dashed line) at the 3rd gear, but has a higher accelerator rigidity than the first changing point P5*a*. That is, at the first changing point of the rigidity characteristic at the 2nd and higher gear positions, the acceleration is the same, but the accelerator rigidity increases as the gear position becomes higher. Note that the second changing points of the rigidity characteristic at the 2nd and higher gear positions do not change (i.e., are constant), regardless of a gear position. Note that illustration of the rigidity characteristics of the 4th gear and the 5th gear are omitted.

Normally, the gear is changed when the vehicle becomes in a constant-speed state after the accelerator pedal 4 is released. In this embodiment, since the first changing point is set for dividing the non-accelerating range and the first acceleration range, and the rigidity increasing rate in the non-accelerating range is set smaller than the rigidity increasing rate in the first acceleration range, the operator can sense the constant-speed state intuitively based on the sensation when he/she steps on the accelerator pedal 4 to judge a timing of a gear shift.

Figure 7:
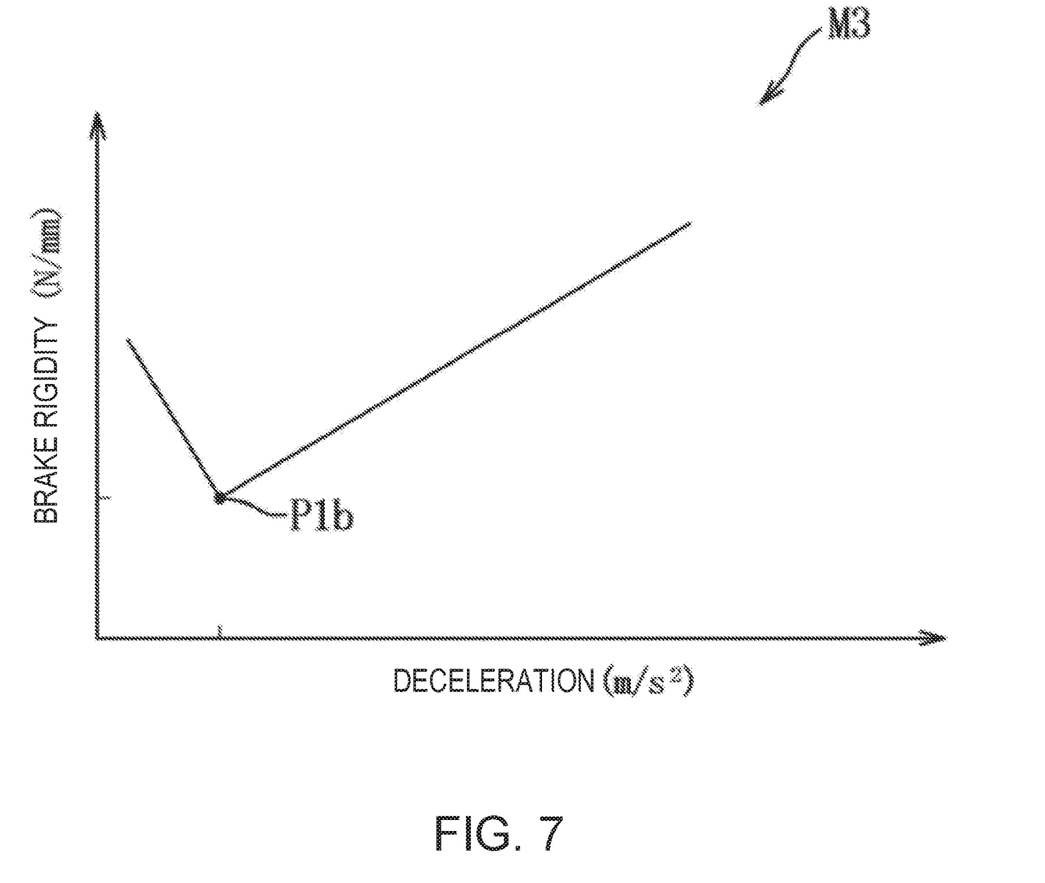
FIG. 7 is a brake rigidity characteristic map.

As illustrated in FIG. 7, in the brake rigidity characteristic map M3, the lateral axis indicates a deceleration (m/s') and the vertical axis indicates a brake rigidity (N/mm). The brake rigidity can be obtained by dividing the reaction force of the brake pedal 5 by the operating amount of the brake pedal 5 (stepping stroke). In the brake rigidity characteristic map M3, a first changing point P1*b* is set to divide a non-decelerating range (a play range and a constant-speed range) and a decelerating range.

Note that a brake control is opposite in the operating direction of the vehicle from the accelerator control described previously. However, since the vehicle behavior (acceleration of the vehicle) increases as the deceleration increases, the deceleration can be considered to be a negative acceleration. Thus, in this embodiment, the deceleration is treated as one of the accelerations like the lateral acceleration. The following description will be made under a condition that the acceleration increases as the deceleration increases.

The first changing point P1*b* is set to a deceleration of the vehicle which can be sensed by the operator. Assume that a rigidity increasing rate in the non-decelerating range is Kb0 and, when the rigidity increasing rate in the decelerating range is Kb1, a relation of the following formula (3) can be established.

$$Kb0 < 0 < Kb1 \qquad (3)$$

Since the brake pedal 5 has the suspended pedal support structure, the weight of the operator's leg acts on the brake pedal 5 even before a pedal operation. Thus, the rigidity increasing rate Kb0 is set as a negative value in order to secure the suitable play range and the constant-speed range in consideration of the weight of the leg.

Next, the steering control module 22, the accelerator control module 23, the brake control module 24, and the reaction-force control module 25 are described. The steering control module 22 selects one of the plurality of lateral acceleration characteristic maps based on the traveling speed of the vehicle, and calculates the lateral acceleration based on the selected lateral acceleration characteristic map, and the slip angle of the front wheels 10 calculated based on the steering angle of the steering wheel 3. A target steering angle is calculated based on the lateral acceleration, and an operating instruction signal to be transmitted to the steering motor 14 is created. Moreover, the steering control module 22 calculates the steering rigidity based on the calculated lateral acceleration and the steering rigidity characteristic map M1, and transmits to the motor 33 the operating instruction signal corresponding to the steering rigidity.

The accelerator control module 23 selects one of the plurality of acceleration characteristic maps based on the traveling speed of the vehicle and the gear position, and calculates the acceleration based on the selected acceleration characteristic map and the operating amount of the accelerator pedal 4 (rotation angle). A target torque is calculated based on the acceleration, and an operating instruction signal to be transmitted to the throttle drive motor 15 is created. Moreover, the accelerator control module 23 calculates the accelerator rigidity based on the calculated acceleration and the accelerator rigidity characteristic map M2, and transmits to the motor 43 the operating instruction signal corresponding to the accelerator rigidity.

The brake control module 24 calculates the deceleration based on the operating amount of the brake pedal 5 (stepping stroke) and the deceleration characteristic map. A target braking pressure is calculated based on the deceleration, and an operating instruction signal to be transmitted to the pump drive motor 16 is created. Moreover, the brake control module 24 calculates the brake rigidity based on the calculated deceleration and the brake rigidity characteristic map M3, and transmits to the motor 53 the operating instruction signal corresponding to the brake rigidity.

The reaction-force control module 25 controls the motors 33, 43, and 53 so that the reaction force generated by the motors 33, 43, and 53 become a reaction-force value set by the steering control module 22, accelerator control module 23, and the brake control module 24.

Figure 8:
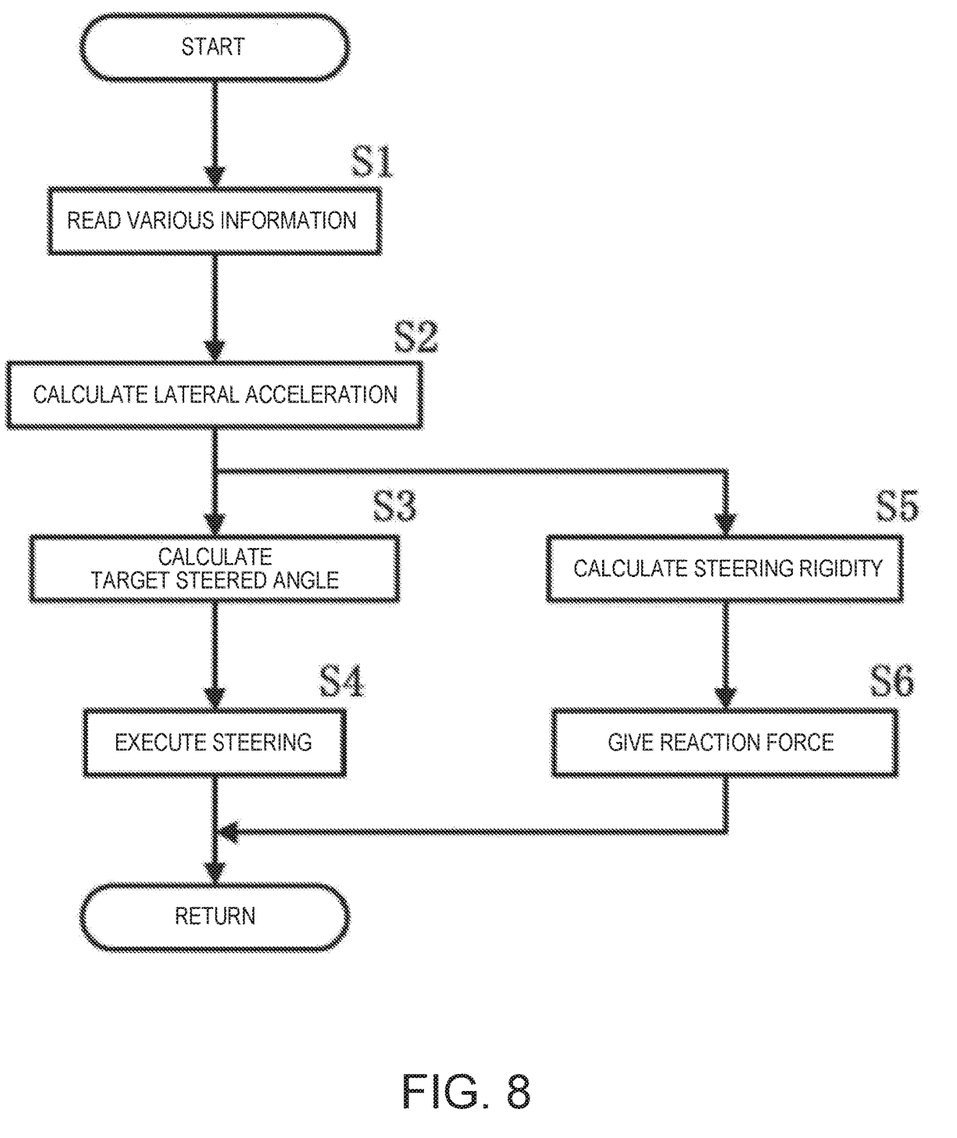
FIG. 8 is a flowchart illustrating a steering control.

Next, a steering control is described based on a flowchart of FIG. 8. Here, Si (i=1, 2, . . . ) indicates a step of each processing. First, at S1, the steering control module 22 reads a variety of information, such as the steering angle of the steering wheel 3, the lateral acceleration characteristic map, and the steering rigidity characteristic map M1, and then shifts to S2. At S2, the steering control module 22 calculates the lateral acceleration based on the lateral acceleration characteristic map, etc., and then shifts to S3 and S5.

At S3, the steering control module 22 calculates a target steering angle based on the lateral acceleration, and then shifts to S4. At S4, the steering control module 22 controls the steering motor 14 to steer the wheels 10 to the target steering angle, and then returns to S1. After S2, the steering control module 22 calculates, synchronizedly with S3, a target steering rigidity based on the lateral acceleration and the steering rigidity characteristic map M1 (S5), and then shifts to S6. At S6, the steering control module 22 controls the motor 33 so that the steering wheel 3 has the steering rigidity corresponding to the lateral acceleration, and then returns to S1.

Figure 9:
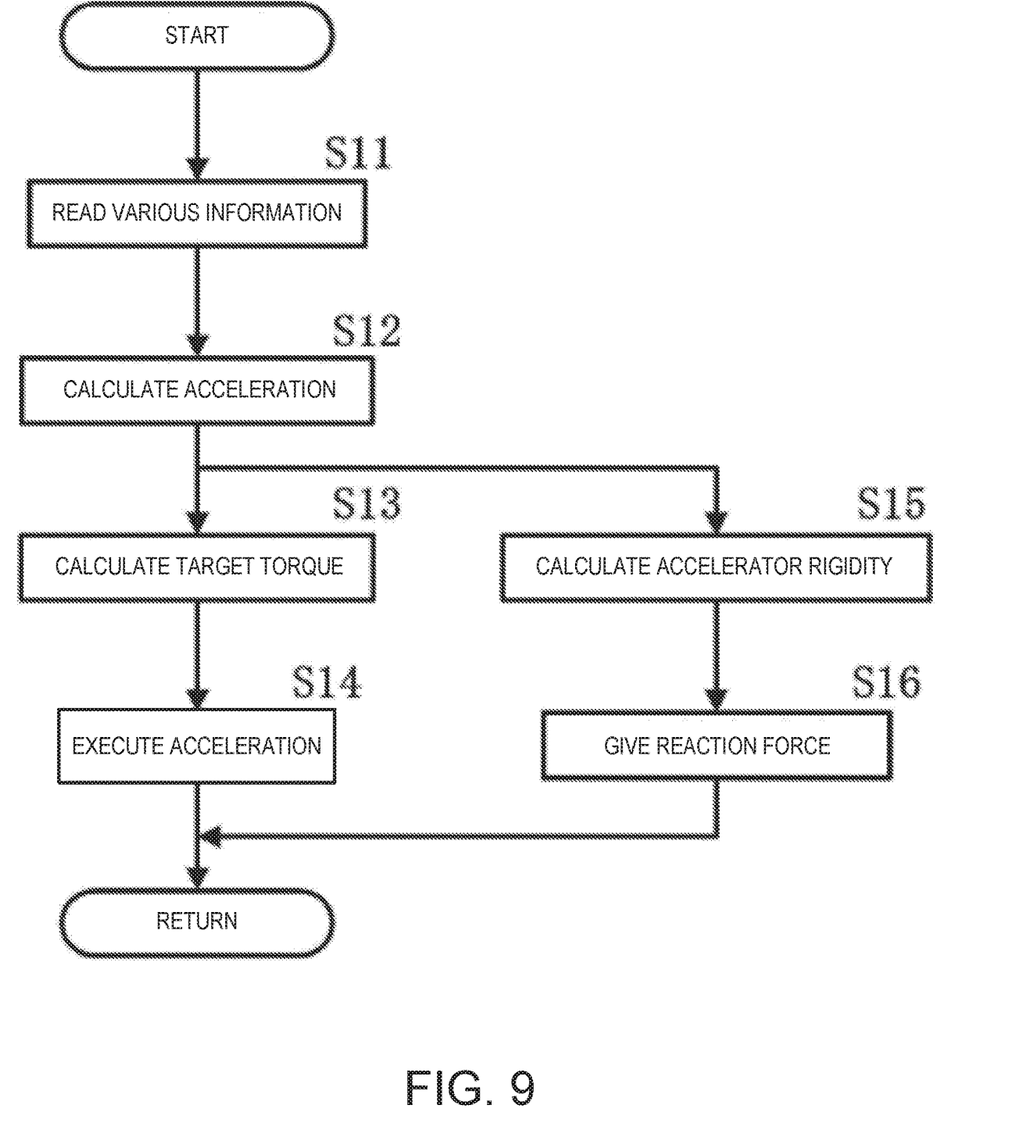
FIG. 9 is a flowchart illustrating an accelerator control.

Next, an accelerator control is described based on a flowchart of FIG. 9. Note that the accelerator control is executed in parallel with the steering control illustrated in FIG. 8. First, at S11, the accelerator control module 23 reads a variety of information, such as the rotation angle of the accelerator pedal 4, the acceleration characteristic map, and the accelerator rigidity characteristic map M2, and then shifts to S12. At S12, the accelerator control module 23 calculates the acceleration based on the acceleration characteristic map, etc., and then shifts to S13 and S15.

At S13, the accelerator control module 23 calculates a target torque based on the acceleration, and then shifts to S14. At S14, the accelerator control module 23 controls the throttle drive motor 15 so that the output of the engine 7 reaches the target torque, and then returns to S11. After S12, the accelerator control module 23 calculates, synchronizedly with S13, a target accelerator rigidity based on the acceleration and the accelerator rigidity characteristic map M2 (S15), and then shifts to S16. At S16, the accelerator control module 23 controls the motor 43 so that the accelerator pedal 4 has the accelerator rigidity corresponding to the acceleration, and then returns to S11.

Figure 10:
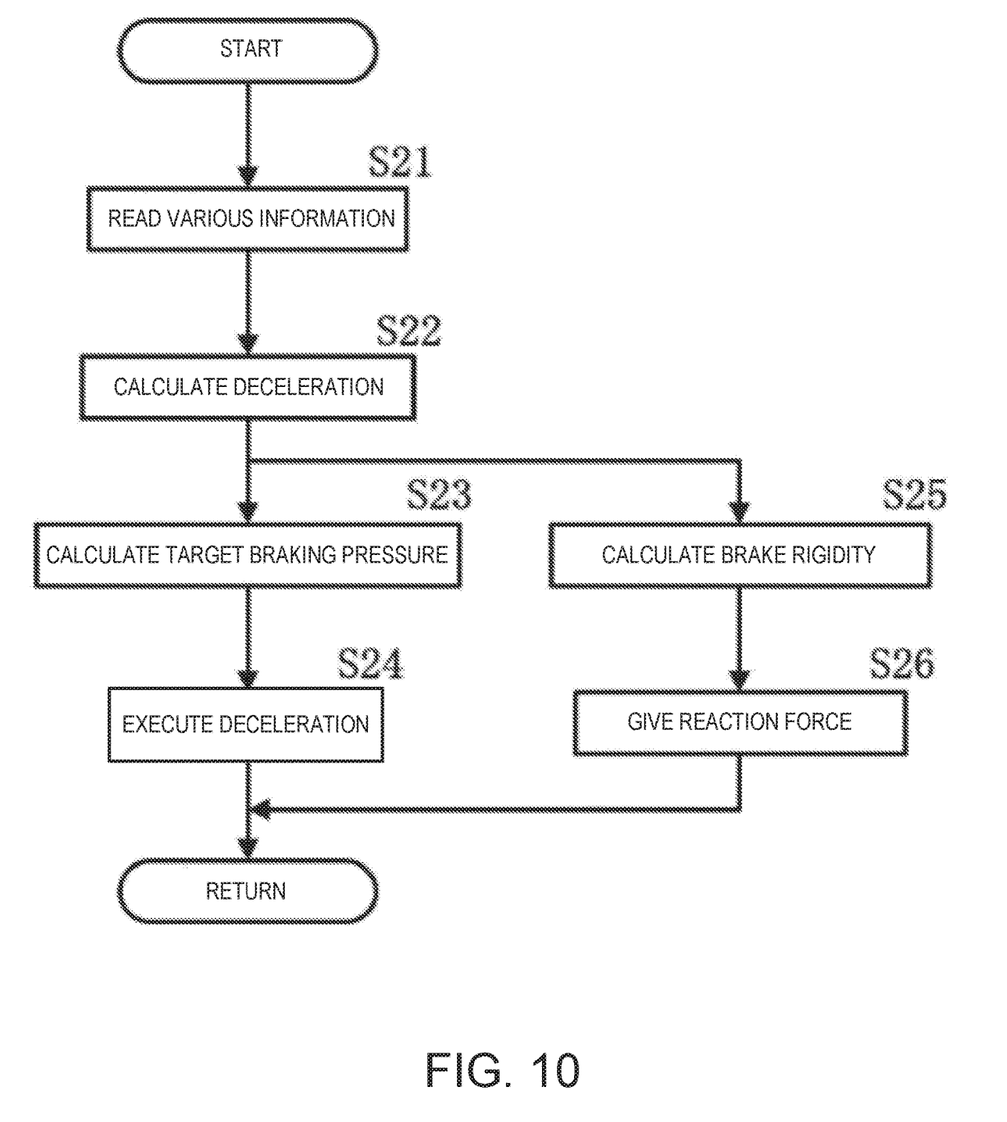
FIG. 10 is a flowchart illustrating a brake control.

Next, a brake control is described based on a flowchart of FIG. 10. Note that the brake control is performed in parallel with the steering control illustrated in FIG. 8 and the accelerator control illustrated in FIG. 9. First, at S21, the brake control module 24 reads a variety of information, such as the stepping stroke of the brake pedal 5, the deceleration characteristic map, and the brake rigidity characteristic map M3, and then shifts to S22. At S22, the brake control module 24 calculates the deceleration based on the deceleration characteristic map etc., and then shifts to S23 and S25.

At S23, the brake control module 24 calculates a target braking pressure based on the deceleration, and then shifts to S24. At S24, the brake control module 24 controls the pump drive motor 16 so that the output of the brake device 9 reaches the target braking pressure, and then returns to S21. After S22, the brake control module 24 calculates, synchronizedly with S23, a target brake rigidity based on the deceleration and the brake rigidity characteristic map M3 (S25), and then shifts to S26. At S26, the brake control module 24 controls the motor 53 so that the brake pedal 5 has the brake rigidity according to the deceleration, then returns to S21.

Next, operation and effects of the control system 1 of this embodiment are described. Since the control system 1 has the accelerator sensor 41 which detects the operating amount of the accelerator pedal 4 by the operator, the speed sensor 12 which detects the traveling speed of the vehicle, and the accelerator control module 23 which calculates the acceleration of the vehicle based on the detected operating amount and traveling speed, the acceleration which is the vehicle behavior resulting from the operating amount of the accelerator pedal 4 by the operator can be calculated. Moreover, since the control system 1 has the reaction-force control module 25 which can control the reaction force given to the operator through the accelerator pedal 4, a suitable operating sensation of the accelerator pedal 4 can be sensed by the operator. Further, since the reaction-force control module 25 controls the reaction force so that the rigidity value which is the ratio of the reaction force of the accelerator pedal 4 to the operating amount increases as the calculated acceleration increases, the operating sensation of the accelerator pedal 4 can be directly associated with the acceleration of the vehicle, thereby matching the physical sensation (load tendency) of the operator through the accelerator pedal 4 with the actual vehicle behavior (acceleration tendency of operation). Therefore, the traveling control of the vehicle with the operator's intuitive operating sensation is possible.

The reaction-force control module 25 is provided with the rigidity characteristic map M2 which defines the rigidity characteristic comprised of the acceleration and the rigidity value. The rigidity characteristic is defined so that the first changing point P1a (P3a, P5a, and P6a) is provided at the position near the acceleration which can be sensed by the operator. The rigidity increasing rate Ka1 when the acceleration is greater than that of the first changing point P1a is greater than the rigidity increasing rate Ka0 when the acceleration is less than that of the first changing point P1a. Therefore, the operator's operating sensation can be divided into the non-accelerating range and the first acceleration range. Moreover, the operator can intuitively recognize the reference point when releasing the accelerator pedal 4.

The rigidity characteristic is also defined so that the second changing point P2a (P4a) is provided of which the acceleration is greater than the first changing point P1a (P3a), and the rigidity increasing rate Ka2 when the acceleration is greater than that of the second changing point P2a is less than the rigidity increasing rate Ka1 when the acceleration is less than that of the second changing point P2a. Therefore, the operability in the second acceleration range is secured, while the operator's operating sensation is divided into the first acceleration range, and the second acceleration range of which the acceleration is greater than the first acceleration range.

The control system 1 has the position sensor 11 which detects the gear position of the vehicle, and since the first changing point P1a is changed according to the detected gear position, the operator's operating sensation can be changed for every gear position.

Since the reaction-force control module 25 controls the electric motor 43 which generates the reaction force according to the rotation angle corresponding to the operating amount of the accelerator pedal 4, the physical sensation of the operator through the accelerator pedal 4 can be matched with the actual vehicle behavior with a simple configuration.

Next, several modifications where the previous embodiment is partially changed will be described.

(Modification 1)

In the embodiment, although the example where the present disclosure is applied to the operation mechanism of the accelerator pedal 4 is described, it may be applied to the brake pedal 5, in addition to or instead of the accelerator pedal 4. In this case, the brake pedal 5 of the suspended pedal support structure may be replaced by a brake pedal of an organ-type pedal support structure, and the first changing point, and the second changing point of which (a magnitude of) the deceleration is greater than that of the first changing point are set. In addition, when the rigidity increasing rate in a non-decelerating range is Kc0, the rigidity increasing rate in a first deceleration control range is Kc1, and the rigidity increasing rate in a second deceleration control range is Kc2, the brake rigidity characteristic is defined so as to satisfy a relation of the following formula.

$$0 \le Kc2 < Kc0 < Kc1$$

Note that when the present disclosure is applied to the brake pedal 5, the second changing point may be omitted and the first changing point may be changed according to the gear position, similar to the above embodiment. Moreover, the present disclosure is also applicable to a shift lever, etc. in addition to the operation mechanism described above.

(Modification 2)

Although in the embodiment the example where the reaction force to be given to the operator through the accelerator pedal 4 is generated only by the motor 43 is described, a biasing mechanism may additionally be used. For example, a long spring with a small diameter and a short spring with a large diameter are prepared, and their spring constants are adjusted. The long spring is inserted into the short spring, and this spring set is disposed between the accelerator pedal 4 and the floor panel. The long spring generates the rigidity increasing rate of Ka0 during the period of 0 to 3.6 degrees of the accelerator valve opening corresponding to the non-accelerating range, the combination of the long spring and the short spring generates the rigidity increasing rate of Ka1 during the period of 3.6 to 4.38 degrees of the accelerator valve opening corresponding to the first acceleration range, and the motor 43 generates the rigidity increasing rate of Ka2 in the second acceleration range.

(Modification 3)

Although in the embodiment the example where the operating amount of the accelerator pedal 4 is the rotation angle on the rotation axis of the accelerator pedal 4 is described, the operating amount of the accelerator pedal 4 may be detected based on the rotation angle of the throttle valve as the parameter.

Those skilled in the art may implement the present disclosure in other forms in which the above embodiment is changed variously, without departing from the subject matter of the present disclosure. The present disclosure also includes such changes. It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Control system
2 ECU (Controller)
4 Accelerator Pedal
5 Brake Pedal
11 Position Sensor
12 Vehicle Speed Sensor
23 Accelerator control module
24 Brake control module
41 Accelerator Sensor
43 Motor
51 Brake Sensor
53 Motor

What is claimed is:

1. A control system for a vehicle, comprising:
an operating amount detector configured to detect an operating amount by an operator, of an operation mechanism comprising at least one of an accelerator pedal and a brake pedal that are mounted on the vehicle;
a speed detector configured to detect a traveling speed of the vehicle;
a reaction-force generator configured to generate a reaction force of the pedal; and
a controller electrically connected with the operating amount detector, the speed detector, and the reaction-force generator, the controller including a processor configured to execute:
an acceleration calculating module to calculate an acceleration based on the traveling speed and the operating amount;
a rigidity characteristic setting module to set the reaction force so that a rigidity value that is a ratio of the reaction force to the operating amount increases as the acceleration calculated by the acceleration calculating module increases; and
a reaction-force control module to control the reaction-force generator so that the reaction force generated by the reaction-force generator becomes the reaction-force value set by the rigidity characteristic setting module.

2. The control system of claim 1, further comprising memory configured to store a rigidity characteristic map defining a rigidity characteristic comprised of the acceleration and the rigidity value, the rigidity characteristic having a first changing point at a position on the map near the acceleration that can be sensed by the operator, and the rigidity characteristic being set so that a rigidity increasing rate when the acceleration is greater than that of the first changing point is greater than a rigidity increasing rate when the acceleration is less than that of the first changing point.

3. The control system of claim 2, wherein the rigidity characteristic has a second changing point at which the acceleration is greater than the first changing point, and the rigidity characteristic being set so that the rigidity increasing rate when the acceleration is greater than that of the second changing point is less than the rigidity increasing rate when the acceleration is less than that of the second changing point.

4. The control system of claim 2, further comprising a gear position detector configured to detect a gear position of the vehicle, the first changing point being changed according to the detected gear position.

5. The control system of claim 3, further comprising a gear position detector configured to detect a gear position of the vehicle, the first changing point being changed according to the detected gear position.

6. The control system of claim 1, wherein the reaction-force generator includes an electric motor configured to generate the reaction force according to the operating amount of the operation mechanism.

7. The control system of claim 2, wherein the reaction-force generator includes an electric motor configured to generate the reaction force according to the operating amount of the operation mechanism.

8. The control system of claim 3, wherein the reaction-force generator includes an electric motor configured to generate the reaction force according to the operating amount of the operation mechanism.

9. The control system of claim 4, wherein the reaction-force generator includes an electric motor configured to generate the reaction force according to the operating amount of the operation mechanism.

10. The control system of claim 5, wherein the reaction-force generator includes an electric motor configured to generate the reaction force according to the operating amount of the operation mechanism.

\* \* \* \* \*